US010447145B1

(12) United States Patent
Perrin et al.

(10) Patent No.: US 10,447,145 B1
(45) Date of Patent: Oct. 15, 2019

(54) SMPS POWER-ON WITH ENERGY SAVER (71) Applicant: STMicroelectronics (Grenoble 2) SAS, Grenoble (FR)

(72) Inventors: Danika Perrin, Jarrie (FR); Valerie Carrat, Grenoble (FR); Marc Sabut, Eybens (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 0 days.

(21) Appl. No.: 16/195,448

(22) Filed: Nov. 19, 2018

(51) Int. Cl.
*H02M 1/36* (2007.01)
*H02M 3/158* (2006.01)
*H02M 1/00* (2006.01)

(52) U.S. Cl.
CPC ............. *H02M 1/36* (2013.01); *H02M 3/158* (2013.01); *H02M 3/1588* (2013.01); *H02M 2001/0032* (2013.01)

(58) Field of Classification Search
CPC ...... H02M 3/156; H02M 1/157; H02M 3/158; H02M 2001/0058; H02M 1/36
See application file for complete search history.

(56) References Cited

U.S. PATENT DOCUMENTS

| 4,806,842 | A | 2/1989 | Bittner |
| 7,129,679 | B2 | 10/2006 | Inaba et al. |
| 7,157,892 | B1 | 1/2007 | Ritter |
| 7,208,927 | B1 | 4/2007 | Nguyen |
| 7,378,827 | B2 | 5/2008 | Stoichita |
| 7,501,805 | B2 | 3/2009 | Chen et al. |
| 7,723,972 | B1 * | 5/2010 | Balogh .................... H02M 1/36 323/282 |
| 2004/0022078 | A1 | 2/2004 | Shieh |
| 2007/0057649 | A1 * | 3/2007 | Yang ....................... G05F 1/468 323/222 |
| 2007/0090817 | A1 | 4/2007 | Yee |
| 2009/0027028 | A1 * | 1/2009 | Ting ........................ H02M 1/36 323/288 |
| 2009/0315530 | A1 | 12/2009 | Baranwal |
| 2012/0206121 | A1 | 8/2012 | Evans et al. |
| 2013/0200873 | A1 | 8/2013 | Wu |
| 2014/0145698 | A1 * | 5/2014 | Saito ....................... G05F 1/468 323/285 |
| 2015/0008955 | A1 | 1/2015 | Kwon et al. |
| 2015/0256060 | A1 | 9/2015 | Faingersh et al. |

(Continued)

*Primary Examiner* — Fred E Finch, III
*Assistant Examiner* — Rafael O. De León Domenech
(74) *Attorney, Agent, or Firm* — Slater Matsil, LLP (57) ABSTRACT

In an embodiment, a method for soft-starting an SMPS includes: asserting an enable signal; disabling an output stage of the SMPS; after asserting the enable signal, measuring a feedback voltage of the SMPS; receiving a first reference voltage at an input reference node; comparing the measured feedback voltage with the first reference voltage; and, when the measured feedback voltage is lower than the first reference voltage, storing the feedback voltage in a soft-start capacitor, connecting an output reference node to the soft-start capacitor, enabling the output stage of the SMPS, and switching a transistor of the output stage to regulate the output voltage based on the feedback voltage and a second reference voltage at the output reference node, and injecting a current into the soft-start capacitor.

20 Claims, 6 Drawing Sheets

(56) References Cited

U.S. PATENT DOCUMENTS

| | | | |
|---|---|---|---|
| 2015/0381032 A1* | 12/2015 | Li | H02M 1/36 323/271 |
| 2016/0380541 A1* | 12/2016 | Moon | G01R 19/04 323/271 |
| 2018/0278045 A1* | 9/2018 | Watanabe | H02H 7/1213 |

* cited by examiner

SMPS POWER-ON WITH ENERGY SAVER

TECHNICAL FIELD

The present invention relates generally to an electronic system and method, and, in particular embodiments, to a switched-mode power supply (SMPS) power-on with energy saver.

BACKGROUND

Figure 1:
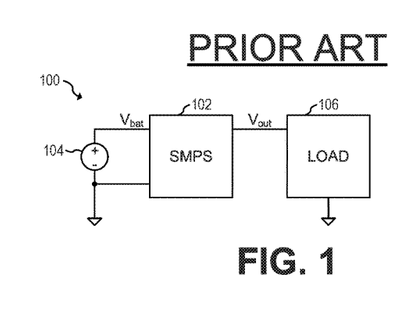
FIG. 1 shows a schematic diagram of an exemplary electronic system.

Electronic systems are pervasive in modern society. Power supply systems or converters are typically used to supply power to many electronic systems. For example, FIG. 1 shows a schematic diagram of exemplary electronic system 100 having converter 102 receiving power from battery 104 and supplying a controlled voltage ($V_{out}$) to a load. The load may be, for example, an integrated circuit inside an electronic device, such as a smartphone or wearable device.

Efficiency is an important parameter for electronic systems in general, and for power supply systems in particular. Increasing efficiency may result in many advantages, such as increase battery life, less heat, etc.

An SMPS is a type of converter that uses a switching regulator to transfer power from an AC or DC source into a load. An SMPS is typically more efficient than other types of power supply systems because it is based on controlled charging and discharging of an inductive element, which reduces energy lost due to power dissipation caused by a resistive voltage drop.

An SMPS may be implemented as a step-down (buck) converter, a step-up (boost) converter, a buck-boost converter, among others. A buck converter, for example, typically maintains a constant voltage at its output over a wide range of input voltages and loads.

An SMPS may be operated in various modes, such as a pulse-width modulation (PWM) mode, pulse frequency modulation (PFM) mode, among others. Techniques, such as pulse skipping, are typically used to further improve efficiency.

SUMMARY

In accordance with an embodiment, a method for soft-starting an SMPS includes: asserting an enable signal; disabling an output stage of the SMPS; after asserting the enable signal, measuring a feedback voltage of the SMPS; receiving a first reference voltage at an input reference node; comparing the measured feedback voltage with the first reference voltage; and, when the measured feedback voltage is lower than the first reference voltage, storing the feedback voltage in a soft-start capacitor, connecting an output reference node to the soft-start capacitor, enabling the output stage of the SMPS, and switching a transistor of the output stage to regulate the output voltage based on the feedback voltage and a second reference voltage at the output reference node, and injecting a current into the soft-start capacitor.

In accordance with an embodiment, a circuit includes: an input terminal configured to receive an input voltage; an output terminal configured to be coupled to an inductor and an output capacitor; a feedback terminal configured to be coupled to the output capacitor; an output stage coupled to the output terminal; a controller configured to regulate an output voltage at the output capacitor based on a first reference voltage and a feedback voltage of the feedback terminal; and a soft-start circuit. The soft-start circuit includes an output reference terminal configured to provide the first reference voltage, an input reference terminal configured to receive a second reference voltage, a soft-start capacitor, a first switch coupled between the input reference terminal and the output reference terminal, and a second switch coupled between the soft-start capacitor and the feedback terminal, and a third switch coupled between the soft-start capacitor and the output reference terminal, where, when an enable signal transitions from a first state to a second state, the soft-start circuit is configured to: disable the output stage, determine a feedback voltage, compare the determined feedback voltage with the second reference voltage, and when the determined feedback voltage is lower than the second reference voltage: close the second switch to store the feedback voltage in the soft-start capacitor, close the third switch, enable the output stage, and inject a current into the soft-start capacitor.

In accordance with an embodiment, a buck converter includes: a first supply terminal and a second supply terminal configured to be coupled to a power source; an output terminal; an inductor coupled to the output terminal; an output capacitor coupled between the inductor and the second supply terminal; a feedback terminal coupled to the output capacitor; an output stage coupled to the output terminal, the output stage including a half-bridge coupled to the output terminal, and a gate driver circuit coupled to the half-bridge; a ramp generator; an error amplifier having a first input configured to receive a first reference voltage and a second input coupled to the feedback terminal; a PWM controller having an output coupled to the output stage and configured to regulate an output voltage at the output capacitor based on an output of the error amplifier and an output of the ramp generator; and a soft-start circuit. The soft-start circuit includes an output reference terminal configured to provide the first reference voltage, an input reference terminal configured to receive a second reference voltage, a soft-start capacitor, a first switch coupled between the input reference terminal and the output reference terminal, a second switch coupled between the soft-start capacitor and the feedback terminal, and a third switch coupled between the soft-start capacitor and the output reference terminal, where, when an enable signal transitions from a first state to a second state, the soft-start circuit is configured to: disable the output stage, determine a feedback voltage at the feedback terminal, compare the determined feedback voltage with the second reference voltage, and when the determined feedback voltage is lower than the second reference voltage: close the second switch to store the feedback voltage in the soft-start capacitor, close the third switch, enable the output stage, and inject a current into the soft-start capacitor.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the embodiments disclosed are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The description below illustrates the various specific details to provide an in-depth understanding of several example embodiments according to the description. The embodiments may be obtained without one or more of the specific details, or with other methods, components, materials and the like. In other cases, known structures, materials or operations are not shown or described in detail so as not to obscure the different aspects of the embodiments. References to "an embodiment" in this description indicate that a particular configuration, structure or feature described in relation to the embodiment is included in at least one embodiment. Consequently, phrases such as "in one embodiment" that may appear at different points of the present description do not necessarily refer exactly to the same embodiment. Furthermore, specific formations, structures or features may be combined in any appropriate manner in one or more embodiments.

The present invention will be described with respect to embodiments in a specific context, a buck converter having a soft-start circuit. Embodiments of the present invention may be used in other SMPS topologies, such as boost and buck-boost topologies, as well as in other circuits implementing a soft-start circuit.

In an embodiment of the present invention, a buck converter saves energy by periodically disabling the buck converter (e.g., when not in use) without discharging the output capacitor. A spike of current flowing through the inductor of the buck converter is avoided by sampling a feedback signal when the buck converter is enabled, and comparing the sampled signal with a threshold. If the sampled signal is higher than the threshold, the buck converter waits until the load draws enough current to decrease the output voltage below the threshold, at which point the buck converter begins operating normally. If the sampled signal is lower than the threshold, the buck converter is enabled and a reference signal is ramped starting from the sampled voltage.

Figure 2A:
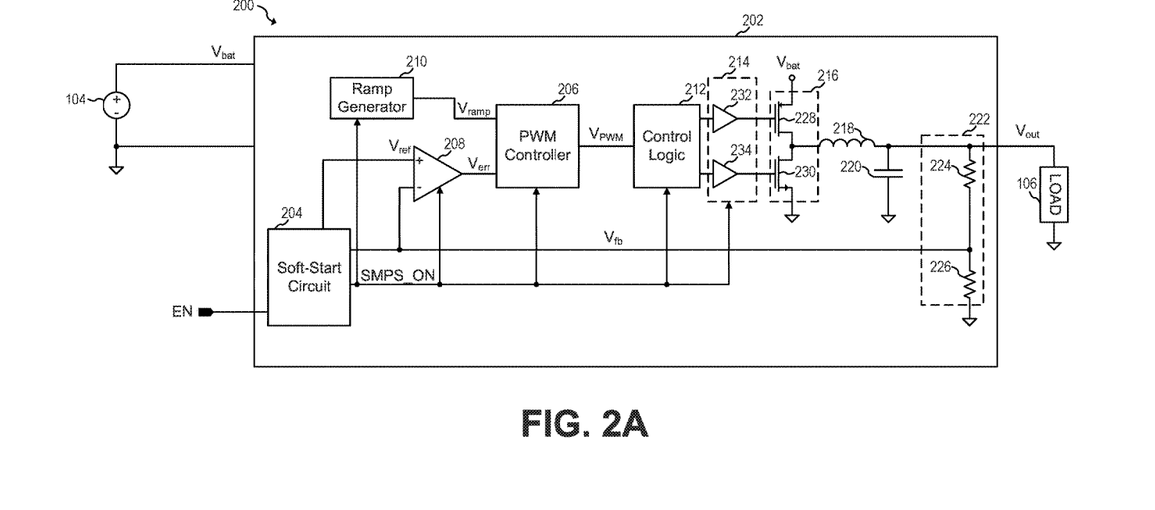
FIG. 2A shows a schematic diagram of an electronic system, according to an embodiment of the present invention.

FIG. 2A shows a schematic diagram of electronic system 200, according to an embodiment of the present invention. Electronic system 200 includes battery 104, load 106, and buck converter 202. Buck converter 202 includes PWM controller 206, control logic 212, gate driver circuit 214, half-bridge 216, inductor 218, output capacitor 220, voltage divider 222, soft-start circuit 204, error amplifier 208 and ramp generator 210.

During normal operation, PWM controller 206 adjusts the duty cycle of signal $V_{PWM}$ such that control logic 212 and gate driver circuit 214 drives half-bridge 216 to produce output voltage $V_{out}$ substantially equal to an expected voltage. PWM controller 206 determines the duty cycle of signal $V_{PWM}$ based on error signal $V_{err}$ and ramp $V_{ramp}$. Error signal $V_{ref}$ is based on feedback voltage $V_{fb}$ (which is based on output voltage $V_{out}$) and reference voltage $V_{ref}$.

Figure 2B:
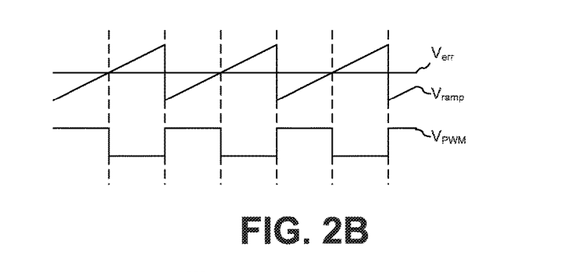
FIG. 2B shows waveforms of the buck converter of FIG. 2A, according to an embodiment of the present invention.

FIG. 2B shows waveforms of buck converter 202, according to an embodiment of the present invention. As shown in FIG. 2B, signal $V_{PWM}$ is low when ramp $V_{ramp}$ is higher than error signal $V_{err}$ and is high when ramp $V_{ramp}$ is lower than error signal $V_{err}$. When output voltage $V_{out}$ decreases, feedback voltage $V_{fb}$ decreases, causing error signal $V_{err}$ to increase, thereby causing the duty cycle of signal $V_{PWM}$ to increase, which increases output voltage $V_{out}$. An opposite behavior is observed when output voltage $V_{out}$ increases, thereby maintaining output voltage $V_{out}$ substantially equal to the expected value. The expected value may be modified by adjusting, for example, the value of resistors 224 or 226, reference voltage $V_{ref}$, the gain of error amplifier 208, or in any other way known in the art.

When activating buck converter 202, a current spike flowing through inductor 218 may occur based on a voltage developed across inductor 218. For example, if output capacitor is charged to a first voltage $V_1$, and reference voltage $V_{ref}$ is initially at 0 V, error signal $V_{err}$ becomes negative, thereby causing transistor 230 to discharge capacitor 220 to ground via inductor 218. Similarly, if output capacitor is initially discharged (o V), and reference voltage $V_{ref}$ is initially high, error signal $V_{err}$ becomes high, thereby casing transistor 228 to rapidly charge output capacitor 220 via inductor 218.

To avoid a current spike flowing through inductor 218 during start-up of buck converter 202, output capacitor 220 is conventionally discharged before enabling buck converter 202. Upon enabling buck converter 202 (e.g., by asserting signal SMPS_ON), reference voltage $V_{ref}$ is conventionally ramped up from 0 V. In this way, output voltage $V_{out}$ is initially at 0 V and reference voltage $V_{ref}$ is initially at 0 V, which causes error signal $V_{err}$ to be initially at 0 V. As reference voltage $V_{ref}$ increases, so does output voltage $V_{out}$, thereby avoiding a current spike from flowing through inductor 218.

In low power systems, buck converter 202 may be activated and deactivated on a regular basis (e.g., using enable signal EN) in order to decrease power consumption. For example, buck converter 202 may be deactivated when not needed to reduce power consumption. In some low power systems, buck converter 202 may be deactivated every 300 ms, 100 ms, or faster. The discharging of output capacitor 220 each activation/deactivation draws current from battery 104, which may be significant. For example, an output capacitor 220 having a capacitance of 2.2 μF charged and discharged to 3 V every 100 ms consumes an average current of about 66 μA from battery 104.

In some embodiments, buck converter 202 saves energy (i.e., increases efficiency) by avoiding discharging output capacitor 220 each activation/deactivation cycle of buck converter 202. Buck converter 202 avoids a current spike flowing through inductor 218 by sampling feedback voltage V when enable signal EN is asserted, and comparing the sampled signal with a threshold. If the sampled signal is higher than the threshold, buck converter 202 waits until load 106 draws enough current to decrease output voltage $V_{out}$ below the threshold, at which point buck converter 202 begins operating normally. If the sampled signal is lower than the threshold, buck converter 202 is enabled and reference voltage $V_{ref}$ is ramped starting from the sampled voltage.

Battery 104 may be, for example, a lithium-ion battery. Other types of power sources may be used. For example, in some embodiments, battery 104 may be a 12 V battery from a car. Other embodiments may implement a power source different than a battery. For example, some embodiments may use the output of a power converter to supply voltage $V_{bat}$ instead of a battery.

Load 106 may be, for example, an integrated circuit, such as processor or micro-controller. The load may also be a circuit inside a power management integrated circuit (PMIC), a light-emitting diode (LED), or any other load that is conventionally supplied by an SMPS.

Transistors 228 and 230 of half-bridge 216 are PMOS and NMOS transistors, respectively. In some embodiments, other types of transistors may be used. For example, in some embodiments, both transistors 228 and 230 may be n-type transistors. Transistors 228 and 230 may be metal-oxide-semiconductor field-effect transistors (MOSFETs), bipolar junction transistors (BJTs), insulated-fate bipolar transistors (IGBTs), junction gate field-effect transistors (JFETs), or others.

Voltage divider 222 is implemented using resistors 224 and 226 as shown in FIG. 2A. In some embodiments, feedback voltage V may be obtained in other ways, such as by using optocouplers, an analog-to-digital converter (ADC) or in other ways known in the art.

PWM controller 206, control logic 212, gate driver circuits 214, error amplifier 208, and ramp generator 210 may be implemented in any way known in the art. For example, in some embodiments, PWM controller 206, control logic 212, gate driver circuits 214, error amplifier 208, and ramp generator 210 may be implemented using custom analog and digital circuits. In other embodiments, PWM controller 206, control logic 212, gate driver circuits 214, error amplifier 208, and ramp generator 210 may be implemented with a general purpose micro-controller and discrete amplifiers.

Some embodiments implement switching techniques different than PWM. For example, some embodiments implement PFM mode instead or in addition to the PWM controller. Other switching techniques may also be used.

In some embodiments, PWM controller 206, control logic 212, gate driver circuits 214, error amplifier 208, ramp generator 210, soft-start circuit 204, half-bridge 216, inductor 218, output capacitor 220, and voltage divider 222 are implemented with discrete components. In other embodiments, PWM controller 206, control logic 212, gate driver circuits 214, error amplifier 208, ramp generator 210, soft-start circuit 204, half-bridge 216 and voltage divider 222 are integrated within the same die of an integrated circuit (IC). In some embodiments, PWM controller 206, control logic 212, gate driver circuits 214, error amplifier 208, ramp generator 210, soft-start circuit 204, half-bridge 216 and voltage divider 222 are integrated in multiple dies within the same package. In some embodiments, half-bridge 216 is implemented externally to the IC or package. Other implementations are also possible.

Figure 3:
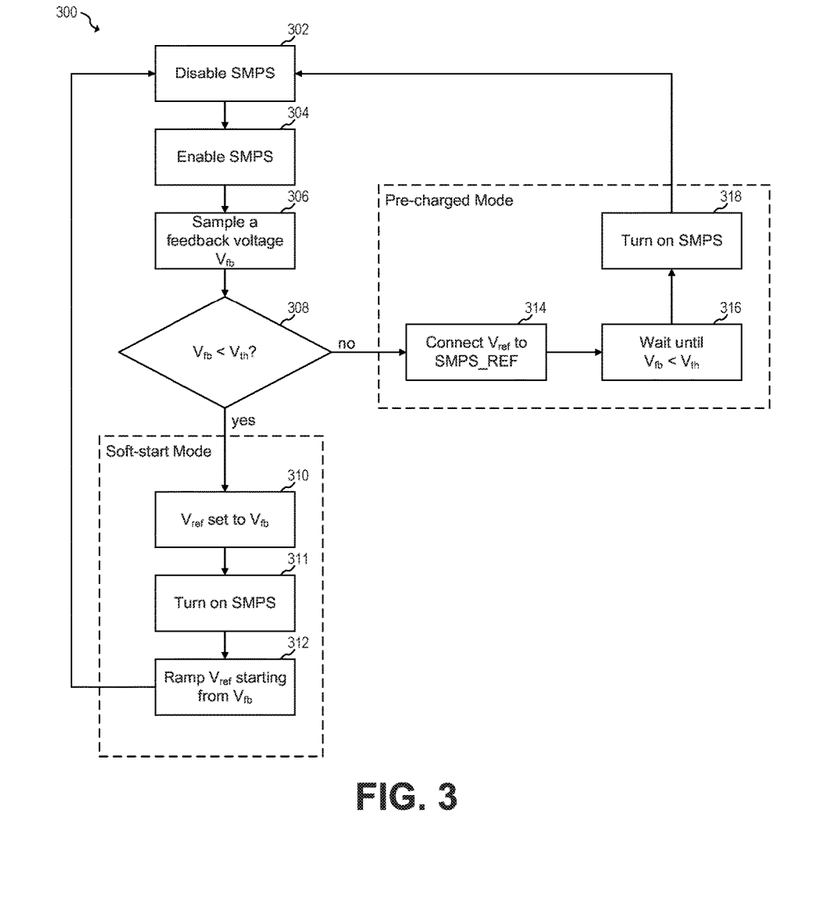
FIG. 3 shows a flowchart of an embodiment method for SMPS power-on, according to an embodiment of the present invention.

FIG. 3 shows a flowchart of embodiment method 300 for SMPS power-on, according to an embodiment of the present invention. FIG. 3 may be understood in view of FIG. 2A. Method 300 may be implemented, for example, by soft-start circuit 204. In some embodiments, method 300 is implemented by a general purpose controller. In other embodiments, method 300 is implemented by custom logic and using analog circuits. Other implementations are also possible.

During step 302, the SMPS, such as buck converter 202 is disabled (e.g., by deasserting enable signal EN). Disabling the SMPS causes the SMPS to stop switching (e.g., half-bridge 216 stops switching). During step 304, the SMPS is enabled (e.g., by asserting enable signal EN). Enabling the SMPS, however, does not cause the SMPS to start switching. In other words, an output stage of the SMPS (e.g., half-bridge 216) is kept off (e.g., drivers 232 and 234 keep off transistors 228 and 230).

After enabling the SMPS, feedback voltage $V_{fb}$ is sampled during step 306. Sampling feedback voltage $V_{fb}$ may be performed by using an ADC, a peak detector, a capacitor, a flip-flop, or in any other way known in the art.

During step 308, feedback voltage $V_{fb}$ is compared with a threshold voltage $V_{th}$. In some embodiments, the threshold voltage $V_{th}$ corresponds to a reference voltage provided by a reference circuit, such as voltage REF_SMPS (not shown in FIG. 2A). In some embodiments, the reference circuit is a bandgap circuit having a voltage of 1.2 V.

If feedback voltage $V_{fb}$ is not lower than the threshold voltage $V_{th}$, the SMPS enters into pre-charged mode, in which a reference voltage provided to the SMPS, such as reference voltage $V_{ref}$ (as shown in FIG. 2A) is connected to the reference voltage (e.g., REF_SMPS) during step 314.

In some embodiments, feedback voltage $V_{fb}$ is higher than threshold voltage $V_t h$ when the SMPS is off (e.g., in high impedance mode) due to leakage (e.g., from a path coupled to a supply voltage). In some embodiments, feedback voltage $V_{fb}$ is intentionally pulled higher than threshold voltage $V_{th}$ (e.g., to supply voltage $V_{bat}$) by pulling up, e.g., output voltage $V_{out}$, using, e.g., a pull-up transistor, when the SMPS is off. By raising output voltage $V_{out}$, thereby charging output capacitor 220, a faster startup time may be achieved.

During step 316, the SMPS waits until feedback voltage $V_{fb}$ decreases below the threshold voltage $V_{th}$. The decrease in voltage may happen due to a load (e.g., load 106) sinking current, due to leakage currents (e.g., in output capacitor 220) for example. After feedback voltage $V_{fb}$ becomes lower than the threshold voltage $V_{th}$, the SMPS is turned on in step 318, which causes the SMPS to start switching and regulating (e.g., half-bridge 216 begins switching). The SMPS may be disabled again for saving energy during step 302.

If feedback voltage $V_{fb}$ is lower than the threshold voltage $V_t h$, the SMPS enters into soft-start mode, in which the reference voltage provided to the SMPS (e.g., $V_{ref}$) is set equal to voltage feedback voltage $V_{fb}$ during step 310. During step 311, the SMPS is turned on, which causes the SMPS to start switching and regulating. During step 312, the reference voltage provided to the SMPS (e.g., $V_{ref}$) is ramped, starting from the initial voltage (e.g., $V_{fb}$) up to voltage REF_SMPS, thereby causing output voltage $V_{out}$, and feedback voltage $V_{fb}$ to ramp up (since the SMPS has already been turned on in step 311). The SMPS may be disabled again for saving energy during step 302. In some embodiments steps 310 and 306 may occur concurrently. In some embodiments, steps 311 and 312 may occur concurrently.

Advantages of some embodiments include the preservation of the charge in the output capacitor of the SMPS upon activating the SMPS in both the pre-charged mode and the soft-start mode. By preserving the charged of the output capacitor, such charge may be delivered to the load instead of being discharged to ground, thereby increasing the efficiency of the SMPS.

In an embodiment, a soft-start circuit samples a feedback voltage of a buck converter by using a comparator and a D-flip-flop. Based on the output of the D-flip-flop, the buck converter enters into pre-charged mode or in soft-start mode. In pre-charged mode, the buck converter connects a reference voltage (e.g., $V_{ref}$) to a second reference voltage (e.g., REF_SMPS) and begins regulating after the feedback decreases below the second reference voltage. In soft-start mode, the buck converter connects the reference voltage to a soft-start capacitor, and injects current into the soft-start capacitor to ramp up the reference voltage.

Figure 4:
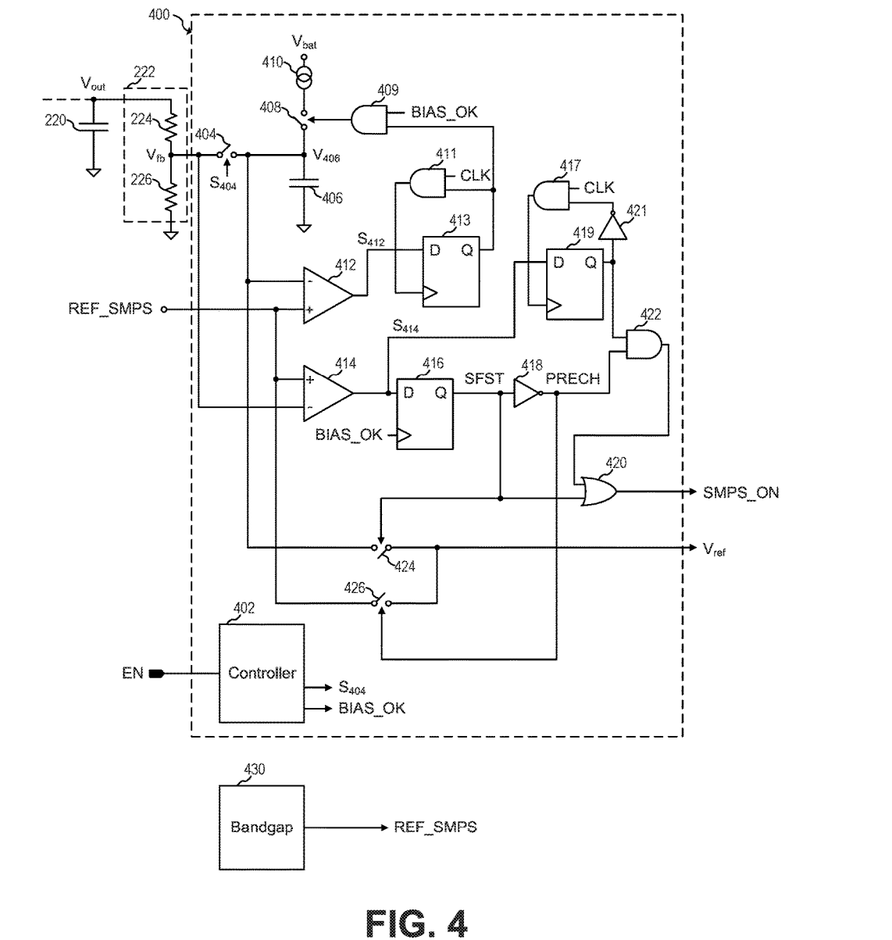
FIG. 4 shows a schematic diagram of a soft-start circuit, according to an embodiment of the present invention.
Figure 5:
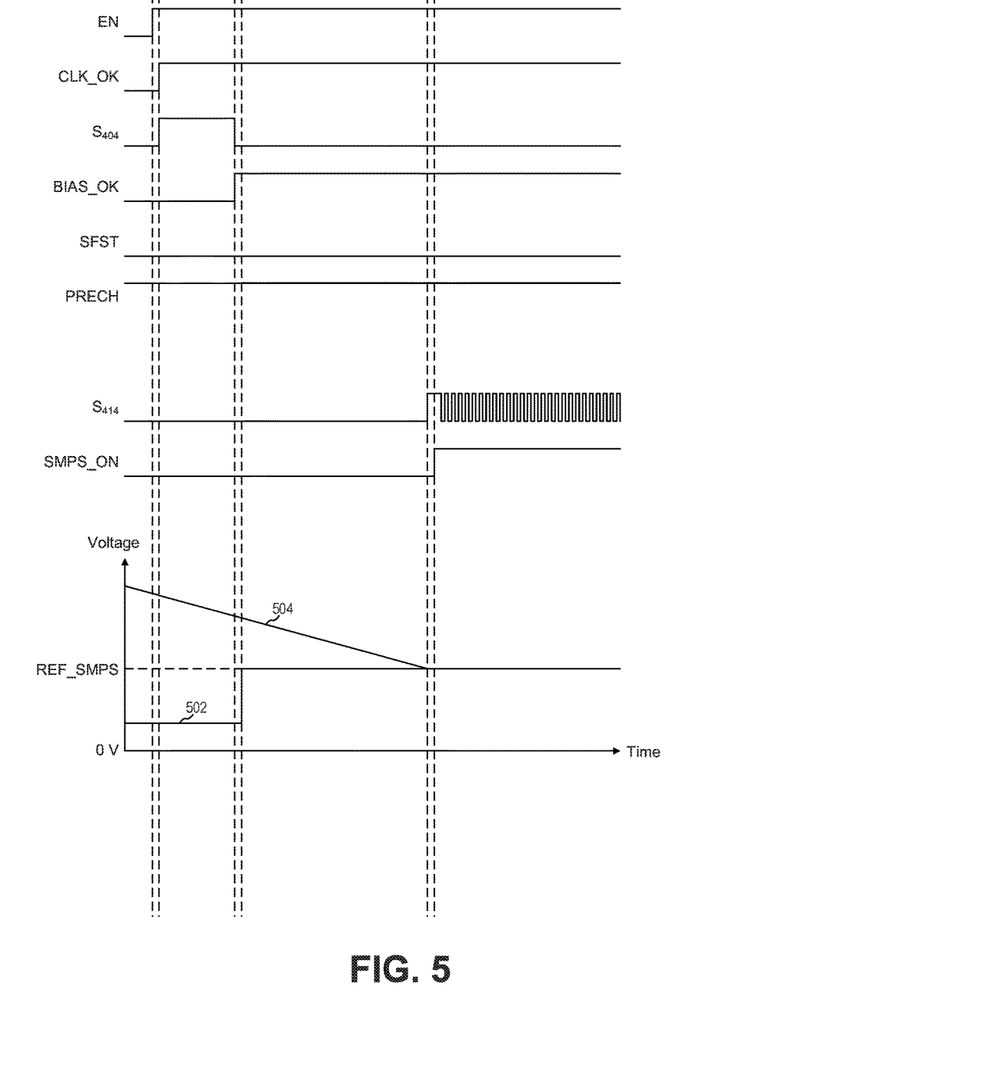
FIGS. 5 and 6 show waveforms of the soft-start circuit of FIG. 4, according to an embodiment of the present invention.
Figure 6:
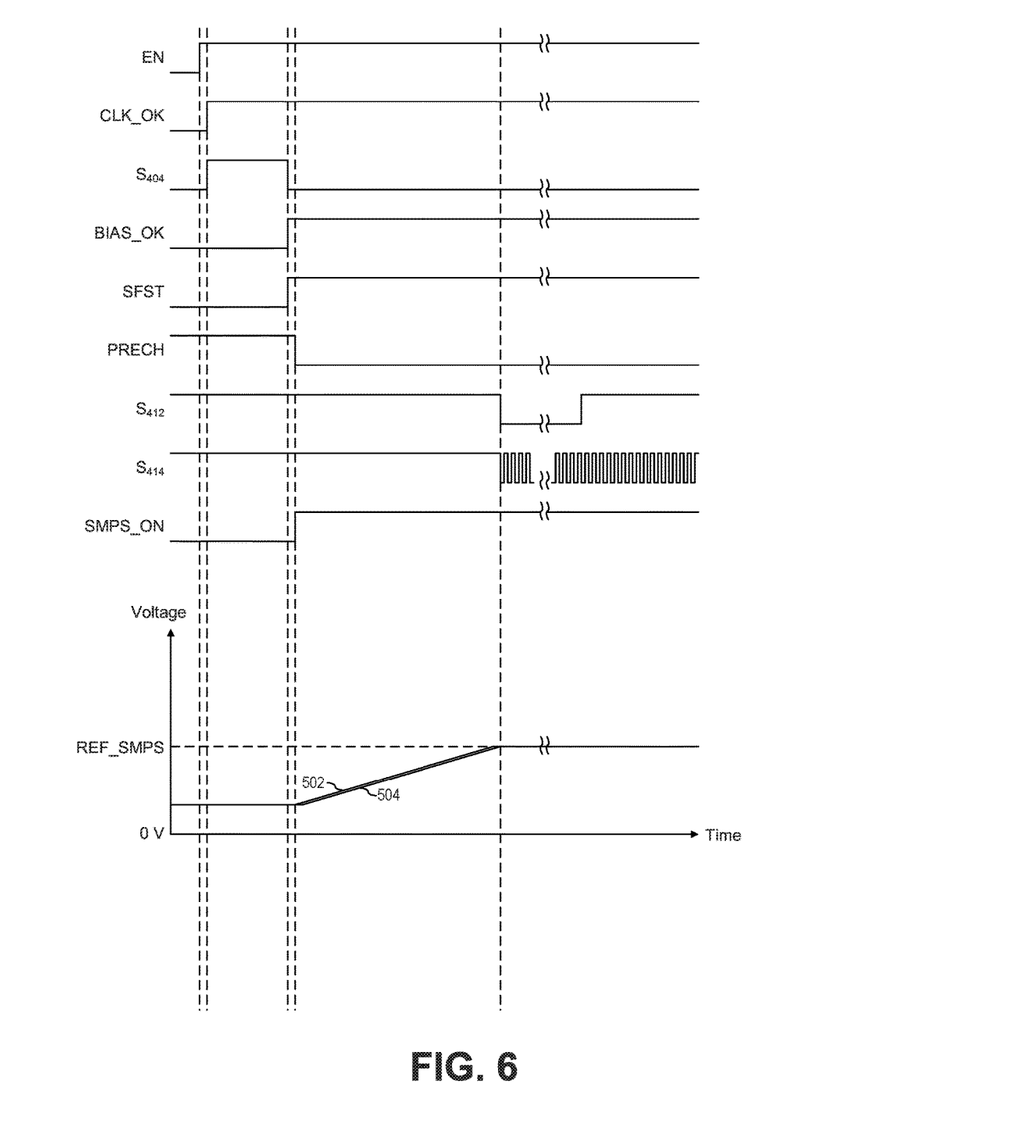

FIG. 4 shows a schematic diagram of soft-start circuit 400, according to an embodiment of the present invention. FIGS. 5 and 6 show waveforms of soft-start circuit 400 during pre-charged mode and soft-start mode, respectively, according to an embodiment of the present invention. FIG. 4 may be understood in view of FIGS. 5 and 6.

Soft-start circuit 400 may implement method 300. Soft-start circuit 400 includes controller 402. Although logic components, such as flip-flops 413, 416, and 419, AND gates 409, 411, 417, and 422 and OR gate 420 are shown separated from controller 402 in FIG. 4, it is understood that controller 402 may include those components.

During normal operation, since output capacitor 220 is not actively discharged after buck converter 202 is disabled, output voltage $V_{out}$ may be different than 0 V before enabling buck converter 202. When enable signal EN is asserted (e.g., transitions from low to high), controller 402 starts clock CLK (as illustrated by signal CLK_OK in FIGS. 4 and 5) and closes switch 404 by asserting signal $S_{404}$ (as illustrated in FIGS. 4 and 5).

Upon starting clock CLK, controller 402 starts a counter (not shown) that counts for a pre-determined time (e.g., 20 us). The pre-determined time may be, for example, an initialization time to properly bias analog blocks of buck converter 202. Once the counter reaches the predetermine time, controller 402 deasserts signal $S_{404}$ and asserts signal BIAS_OK (as illustrated in FIGS. 4 and 5).

Before signal BIAS_OK is asserted, D-flip-flops 413, 416, and 419 are in a reset state (their associated outputs are low). When signal BIAS_OK is asserted, D-flip-flop 416 latches in the output of comparator 414. Comparator 414 outputs a high when voltage REF_SMPS is higher than feedback voltage $V_{fb}$ and a low when voltage REF_SMPS is lower than feedback voltage $V_{fb}$.

If D-flip-flop 416 latches in a 1, signal SFST becomes high, signal PRECH becomes low, and buck converter 202 enters the soft-start mode (as shown in FIG. 6). If D-flip-flop 416 latches in a 0, signal SFST becomes low, signal PRECH becomes high, and buck converter 202 enters the pre-charged mode (as shown in FIG. 5).

When in pre-charged mode, switch 426 is closed by signal PRECH, which causes reference voltage $V_{ref}$ to be connected to voltage REF_SMPS (as shown by curve 502, which illustrates reference voltage $V_{ref}$ in FIG. 5). Signal SMPS_ON, however, remains low until feedback voltage $V_{fb}$ becomes lower than voltage REF_SMPS (as shown by curve 504, which illustrates feedback voltage $V_{fb}$, in FIG. 5). When feedback voltage $V_{fb}$ becomes lower than voltage REF_SMPS, OR gate 420 outputs a 1, which causes signal SMPS_ON to assert, thereby causing buck converter 202 to begin regulating output voltage $V_{out}$.

When in soft-start mode, switch 424 is closed by signal SFST, which causes reference voltage $V_{ref}$ to be connected to soft-start capacitor 406 (which has initially a voltage equal to feedback voltage $V_{fb}$ as a result of pulsing signal $S_{404}$, as shown in FIG. 6). Signal SFST also causes OR gate 420 to output a 1, which causes signal SMPS_ON to assert, thereby causing buck converter 202 to begin regulating output voltage $V_{out}$, as shown in FIG. 6.

As shown in FIG. 4, comparator 412 causes switch 408 to close when voltage REF_SMPS is higher than voltage $V_{406}$. Current source 410, therefore, injects a current into soft-start capacitor 406 than ramps up voltage $V_{406}$, and reference voltage $V_{ref}$ until reference voltage $V_{ref}$ reaches voltage REF_SMPS, as shown by curve 502 in FIG. 6. Since buck converter 202 is regulating output voltage $V_{out}$, feedback voltage $V_{fb}$ also ramps up, as shown by curve 504 in FIG. 6.

Figure 7:
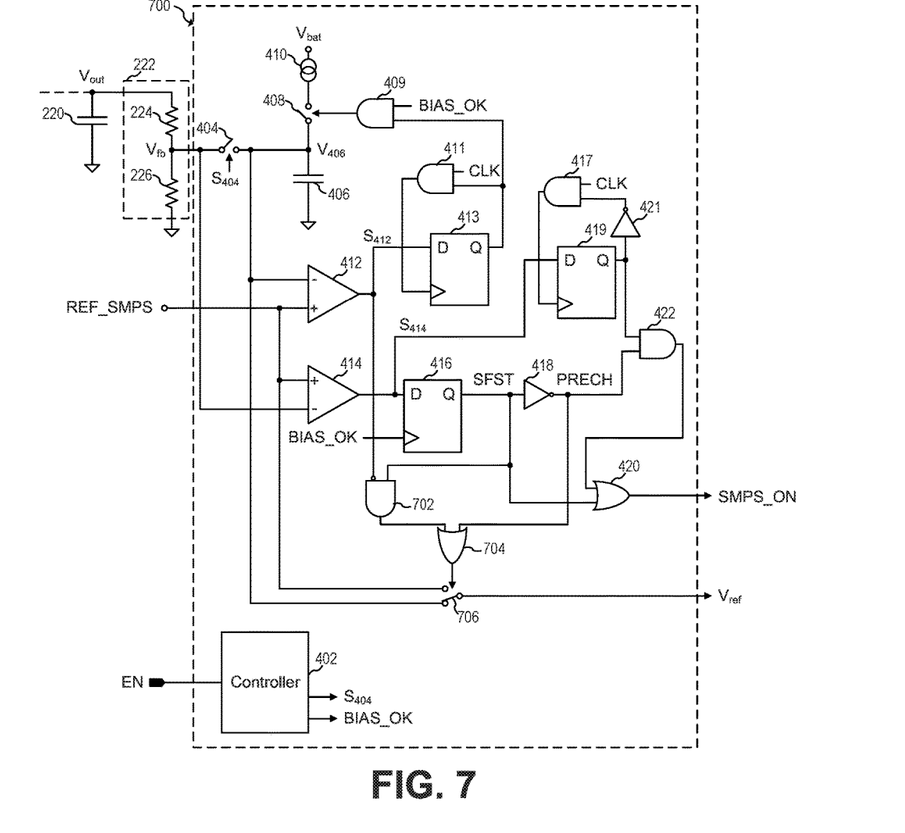
FIG. 7 shows a schematic diagram of a soft-start circuit, according to an embodiment of the present invention.

When voltage $V_{406}$ reaches REF_SMPS, signal $S_{412}$ goes low. D-flip-flop 413 and AND gate 411 latch the output of D-flip-flop 413 to 0, thereby causing switch 408 to open and stop the charging of soft-start capacitor 406. Leakage currents may cause soft-start capacitor 406 to slowly discharge, which causes voltage $V_{406}$ to decreases, thereby causing signal $S_{412}$ to become high. However, signal $S_{412}$ transitioning from low to high does not cause the output of D-flip-flop 413 to change to 1. By avoiding periodically switching switch 408 on and off, ripple in voltage $V_{406}$ is avoided. Such ripple may be undesirable in some embodiments. This is advantageous, for example, for embodiments that exhibit low leakage currents of soft-start capacitor 406. An improvement is shown in FIG. 7, in which AND gate 702 and OR gate 704 allow to connect reference voltage $V_{ref}$ to voltage REF_SMPS after voltage $V_{406}$ reaches voltage REF_SMPS.

In embodiments in which ripple in voltage $V_{406}$ is tolerated, a loop comprising comparator 412, AND gate 409 and switch 408 causes soft-start capacitor 406 to maintain voltage $V_{406}$ at a level substantially equal to voltage REF_SMPS despite any leakage associated with soft-start capacitor 406. For example, in an embodiment that does not implement D-flip-flop 413 and AND gate 411 (e.g., output of comparator 412 directly connected to the input of AND gate 409), voltage $V_{406}$ may be kept substantially equal to REF_SMPS while exhibiting a ripple with a saw-tooth shape.

Switches 404, 424 and 426 may be implemented in any way known in the art, such as using metal-oxide-semiconductor (MOS) transistors, or solid-state relays, or mechanical relays, for example.

Flip-flop 416 is implemented as a D-flip-flop. In some embodiments, a different type of flip-flop, such as an SR-flip-flop, T-flip-flop, or other, may be used with appropriate modifications.

In some embodiments, voltage REF_SMPS may be produced by a bandgap circuit, such as bandgap 430o. In some embodiments, voltage REF_SMPS may be produced by a voltage regulator or voltage source. In some embodiments, voltage REF_SMPS is produced inside soft-start circuit 400. In other embodiments, voltage REF_SMPS is received from a voltage source that is external to soft-start circuit 400.

Controller 402 may be implemented as a stand-alone controller, or as part of another controller. For example, in some embodiments, controllers 206 and 406 are implemented as a single controller.

FIG. 7 shows a schematic diagram of soft-start circuit 700, according to an embodiment of the present invention. Soft-start circuit 700 operates in a similar manner as soft-start circuit 400. Soft-start circuit 700, however, connects reference voltage $V_{ref}$ to voltage REF_SMPS after voltage $V_{406}$ reaches voltage REF_SMPS during soft-start mode.

Soft-start circuit 700 advantageous uses the same voltage REF_SMPS for operating buck converter 202 regardless of which mode was used to power-on buck converter 202. In some embodiments, voltage REF_SMPS may be more stable than a voltage across the soft-start capacitor.

Some embodiments may be applied to SMPS other than buck. For example, a boost converter may save energy by avoiding the discharge of the output capacitor when the boost converter is off.

Example embodiments of the present invention are summarized here. Other embodiments can also be understood from the entirety of the specification and the claims filed herein.

Example 1

A method for soft-starting a switched-mode power supply (SMPS), the method including: asserting an enable signal, where the SMPS is activated or deactivated based on the enable signal; disabling an output stage of the SMPS; after asserting the enable signal, measuring a feedback voltage of the SMPS, the feedback voltage being based on an output voltage of the SMPS; receiving a first reference voltage at an input reference node; comparing the measured feedback voltage with the first reference voltage; and when the measured feedback voltage is lower than the first reference voltage: storing the feedback voltage in a soft-start capacitor, connecting an output reference node to the soft-start capacitor, enabling the output stage of the SMPS and switching a transistor of the output stage to regulate the output voltage based on the feedback voltage and a second reference voltage at the output reference node, and injecting a current into the soft-start capacitor.

Example 2

The method of example 1, further including, when the measured feedback voltage is higher than the first reference voltage, connecting the input reference node to the output reference node, waiting until the feedback voltage decreases to a voltage lower than the first reference voltage, and when the feedback voltage becomes lower than the first reference voltage, enabling the output stage of the SMPS and switching the transistor of the output stage to regulate the output voltage based on the feedback voltage and the second reference voltage.

Example 3

The method of one of examples 1 or 2, further including, when the measured feedback voltage is lower than the first reference voltage, connecting the input reference node to t output reference node after a voltage of the soft-start capacitor reaches the first reference voltage.

Example 4

The method of one of examples 1 to 3, further including receiving the first reference voltage from a bandgap circuit.

Example 5

The method of one of examples 1 to 4, where the feedback voltage is lower than the output voltage.

Example 6

The method of one of examples 1 to 5, where the transistor is a transistor of a half-bridge of the SMPS.

Example 7

The method of one of examples 1 to 6, where disabling the SMPS includes turning off the transistor and a second transistor of the half-bridge.

Example 8

The method of one of examples 1 to 7, further including asserting and deasserting the enable signal every 300 ms or faster.

Example 9

The method of one of examples 1 to 8, further including pulling up the output voltage when the SMPS is deactivated.

Example 10

A circuit including: an input terminal configured to receive an input voltage; an output terminal configured to be coupled to an inductor and an output capacitor; a feedback terminal configured to be coupled to the output capacitor; an output stage coupled to the output terminal; a controller configured to regulate an output voltage at the output capacitor based on a first reference voltage and a feedback voltage of the feedback terminal; and a soft-start circuit including an output reference terminal configured to provide the first reference voltage, an input reference terminal configured to receive a second reference voltage, a soft-start capacitor, a first switch coupled between the input reference terminal and the output reference terminal, and a second switch coupled between the soft-start capacitor and the feedback terminal, and a third switch coupled between the soft-start capacitor and the output reference terminal, where, when an enable signal transitions from a first state to a second state, the soft-start circuit is configured to: disable the output stage, determine a feedback voltage, compare the determined feedback voltage with the second reference voltage, and when the determined feedback voltage is lower than the second reference voltage: close the second switch to store the feedback voltage in the soft-start capacitor, close the third switch, enable the output stage, and inject a current into the soft-start capacitor.

Example 11

The circuit of example 10, where the soft-start circuit is further configured to, when the determined feedback voltage is higher than the second reference voltage, close the first switch to provide the second reference voltage to the output reference terminal, wait until the feedback voltage decreases to a voltage lower than the second reference voltage, and enable the output stage when the feedback voltage becomes lower than the second reference voltage.

Example 12

The circuit of one of examples 10 or 11, where the soft-start circuit is further configured to, when the determined feedback voltage is lower than the second reference voltage, provide the second reference voltage at the output reference terminal after a voltage of the soft-start capacitor reaches the second reference voltage.

Example 13

The circuit of one of examples 10 to 12, where the soft-start circuit further includes a current source and a fourth switch coupled between the current source and the soft-start capacitor, where the soft-start circuit is configured to inject the current into the soft-start capacitor by closing the fourth switch.

Example 14

The circuit of one of examples 10 to 13, where the soft-start circuit further includes: a comparator having a first input coupled to the input reference terminal, and a second input coupled to the feedback terminal; and a flip-flop having an input coupled to an output of the comparator and a second input configured to receive a first signal, where the soft-start circuit is configured to compare the feedback voltage with the second reference voltage by asserting the first signal.

Example 15

The circuit of one of examples 10 to 14, where the flip-flop is a D-flip-flop and the second input of the flip-flop is a clock input.

Example 16

The circuit of one of examples 10 to 15, further including the inductor and the output capacitor, where the output terminal is coupled to the inductor and the output capacitor.

Example 17

The circuit of one of examples 10 to 16, further including a first resistor coupled between the output capacitor and the feedback terminal, and a second resistor coupled between the feedback terminal and a reference terminal.

Example 18

The circuit of one of examples 10 to 17, where the output stage includes a half-bridge.

Example 19

A buck converter including: a first supply terminal and a second supply terminal configured to be coupled to a power source; an output terminal; an inductor coupled to the output terminal; an output capacitor coupled between the inductor and the second supply terminal; a feedback terminal coupled to the output capacitor; an output stage coupled to the output terminal, the output stage including a half-bridge coupled to the output terminal, and a gate driver circuit coupled to the half-bridge; a ramp generator; an error amplifier having a first input configured to receive a first reference voltage and a second input coupled to the feedback terminal; a pulse-width modulation (PWM) controller having an output coupled to the output stage and configured to regulate an output voltage at the output capacitor based on an output of the error amplifier and an output of the ramp generator; and a soft-start circuit including an output reference terminal configured to provide the first reference voltage, an input reference terminal configured to receive a second reference voltage, a soft-start capacitor, a first switch coupled between the input reference terminal and the output reference terminal, a second switch coupled between the soft-start capacitor and the feedback terminal, and a third switch coupled between the soft-start capacitor and the output reference terminal, where, when an enable signal transitions from a first state to a second state, the soft-start circuit is configured to: disable the output stage, determine a feedback voltage at the feedback terminal, compare the determined feedback voltage with the second reference voltage, and when the determined feedback voltage is lower than the second reference voltage: close the second switch to store the feedback voltage in the soft-start capacitor, close the third switch, enable the output stage, and inject a current into the soft-start capacitor.

Example 20

The buck converter of example 19, where the soft-start circuit is furthered configured to, when the determined feedback voltage is higher than the second reference voltage, close the first switch to provide the second reference voltage to the output reference terminal, wait until the feedback voltage decreases to a voltage lower than the second reference voltage, and when the feedback voltage becomes lower than the second reference voltage, enable the output stage.

Example 21

The buck converter of one of examples 19 or 20, further including the power source, where the power source is a battery.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for soft-starting a switched-mode power supply (SMPS), the method comprising:
asserting an enable signal, wherein the SMPS is activated or deactivated based on the enable signal;
disabling an output stage of the SMPS;
after asserting the enable signal, measuring a feedback voltage of the SMPS, the feedback voltage being based on an output voltage of the SMPS;
receiving a first reference voltage at an input reference node; comparing the measured feedback voltage with the first reference voltage;
and when the measured feedback voltage is lower than the first reference voltage: storing the feedback voltage in a soft-start capacitor,
connecting an output reference node to the soft-start capacitor,
enabling the output stage of the SMPS and switching a transistor of the output stage to regulate the output voltage based on the feedback voltage and
a second reference voltage at the output reference node, and injecting a current into the soft-start capacitor,
when the measured feedback voltage is higher than the first reference voltage, connecting the input reference node to the output reference node, waiting until the feedback voltage decreases to a voltage lower than the first reference voltage, and when the feedback voltage becomes lower than the first reference voltage, enabling the output stage of the SMPS and switching the transistor of the output stage to regulate the output voltage based on the feedback voltage and the second reference voltage.

2. The method of claim 1, further comprising receiving the first reference voltage from a bandgap circuit.

3. The method of claim 1, wherein the feedback voltage is lower than the output voltage.

4. The method of claim 3, wherein the transistor is a transistor of a half-bridge of the SMPS.

5. The method of claim 4, wherein disabling the SMPS comprises turning off the transistor and a second transistor of the half-bridge.

6. The method of claim 1, further comprising asserting and deasserting the enable signal every 300 ms or faster.

7. The method of claim 1, further comprising pulling up the output voltage when the SMPS is deactivated.

8. A circuit comprising:
an input terminal configured to receive an input voltage;
an output terminal configured to be coupled to an inductor and an output capacitor;
a feedback terminal configured to be coupled to the output capacitor;
an output stage coupled to the output terminal;
a controller configured to regulate an output voltage at the output capacitor based on a first reference voltage and a feedback voltage of the feedback terminal; and
a soft-start circuit comprising an output reference terminal configured to provide the first reference voltage, an input reference terminal configured to receive a second reference voltage, a soft-start capacitor, a first switch coupled between the input reference terminal and the output reference terminal, and a second switch coupled between the soft-start capacitor and the feedback terminal, and a third switch coupled between the soft-start capacitor and the output reference terminal, wherein, when an enable signal transitions from a first state to a second state, the soft-start circuit is configured to:
disable the output stage,
determine the feedback voltage,
compare the determined feedback voltage with the second reference voltage, and
when the determined feedback voltage is lower than the second reference voltage:
close the second switch to store the feedback voltage in the soft-start capacitor,
close the third switch,
enable the output stage, and
inject a current into the soft-start capacitor.

9. The circuit of claim 8, wherein the soft-start circuit is further configured to, when the determined feedback voltage is higher than the second reference voltage,
close the first switch to provide the second reference voltage to the output reference terminal,
wait until the feedback voltage decreases to a voltage lower than the second reference voltage, and
enable the output stage when the feedback voltage becomes lower than the second reference voltage.

10. The circuit of claim 8, wherein the soft-start circuit is further configured to, when the determined feedback voltage is lower than the second reference voltage, provide the second reference voltage at the output reference terminal after a voltage of the soft-start capacitor reaches the second reference voltage.

11. The circuit of claim 8, wherein the soft-start circuit further comprises a current source and a fourth switch coupled between the current source and the soft-start capacitor, wherein the soft-start circuit is configured to inject the current into the soft-start capacitor by closing the fourth switch.

12. The circuit of claim 8, wherein the soft-start circuit further comprises:
a comparator having a first input coupled to the input reference terminal, and a second input coupled to the feedback terminal; and
a flip-flop having an input coupled to an output of the comparator and a second input configured to receive a first signal, wherein the soft-start circuit is configured to compare the feedback voltage with the second reference voltage by asserting the first signal.

13. The circuit of claim 12, wherein the flip-flop is a D-flip-flop and the second input of the flip-flop is a clock input.

14. The circuit of claim 8, further comprising the inductor and the output capacitor, wherein the output terminal is coupled to the inductor and the output capacitor.

15. The circuit of claim 14, further comprising a first resistor coupled between the output capacitor and the feedback terminal, and a second resistor coupled between the feedback terminal and a reference terminal.

16. The circuit of claim 8, wherein the output stage comprises a half-bridge.

17. A buck converter comprising:
a first supply terminal and a second supply terminal configured to be coupled to a power source;
an output terminal;
an inductor coupled to the output terminal;
an output capacitor coupled between the inductor and the second supply terminal;
a feedback terminal coupled to the output capacitor;
an output stage coupled to the output terminal, the output stage comprising a half-bridge coupled to the output terminal, and a gate driver circuit coupled to the half-bridge;
a ramp generator;
an error amplifier having a first input configured to receive a first reference voltage and a second input coupled to the feedback terminal;
a pulse-width modulation (PWM) controller having an output coupled to the output stage and configured to regulate an output voltage at the output capacitor based on an output of the error amplifier and an output of the ramp generator; and
a soft-start circuit comprising an output reference terminal configured to provide the first reference voltage, an input reference terminal configured to receive a second reference voltage, a soft-start capacitor, a first switch coupled between the input reference terminal and the output reference terminal, a second switch coupled between the soft-start capacitor and the feedback terminal, and a third switch coupled between the soft-start capacitor and the output reference terminal, wherein, when an enable signal transitions from a first state to a second state, the soft-start circuit is configured to:
disable the output stage,
determine a feedback voltage at the feedback terminal,
compare the determined feedback voltage with the second reference voltage, and
when the determined feedback voltage is lower than the second reference voltage:

close the second switch to store the feedback voltage in the soft-start capacitor, close the third switch, enable the output stage, and inject a current into the soft-start capacitor.

18. The buck converter of claim 17, wherein the soft-start circuit is furthered configured to, when the determined feedback voltage is higher than the second reference voltage, close the first switch to provide the second reference voltage to the output reference terminal, wait until the feedback voltage decreases to a voltage lower than the second reference voltage, and when the feedback voltage becomes lower than the second reference voltage, enable the output stage.

19. The buck converter of claim 17, further comprising the power source, wherein the power source is a battery.

20. A method for soft-starting a switched-mode power supply (SMPS), the method comprising:

asserting an enable signal, wherein the SMPS is activated or deactivated based on the enable signal;

disabling an output stage of the SMPS;

after asserting the enable signal, measuring a feedback voltage of the SMPS, the feedback voltage being based on an output voltage of the SMPS;

receiving a first reference voltage at an input reference node;

comparing the measured feedback voltage with the first reference voltage;

when the measured feedback voltage is lower than the first reference voltage:

storing the feedback voltage in a soft-start capacitor, connecting an output reference node to the soft-start capacitor, enabling the output stage of the SMPS and switching a transistor of the output stage to regulate the output voltage based on the feedback voltage and a second reference voltage at the output reference node, and injecting a current into the soft-start capacitor; and when the measured feedback voltage is lower than the first reference voltage, connecting the input reference node to the output reference node after a voltage of the soft-start capacitor reaches the first reference voltage.

* * * * *